Patented Sept. 26, 1944

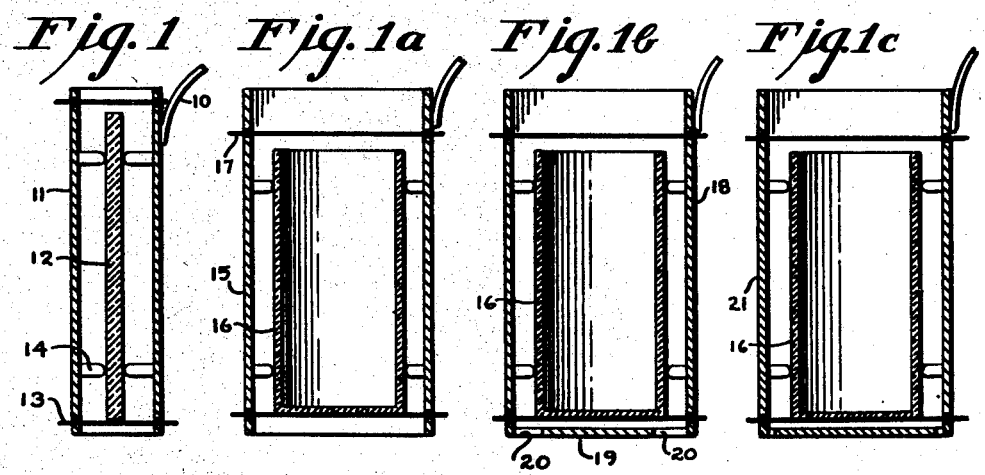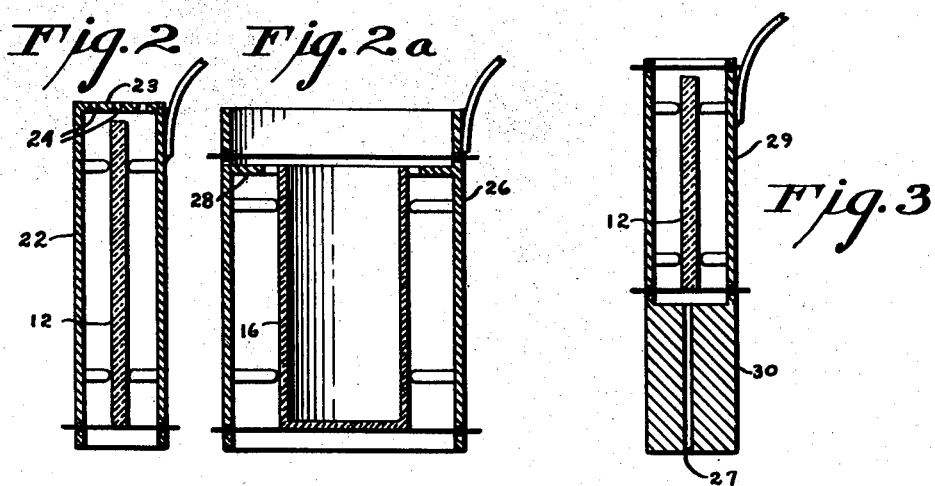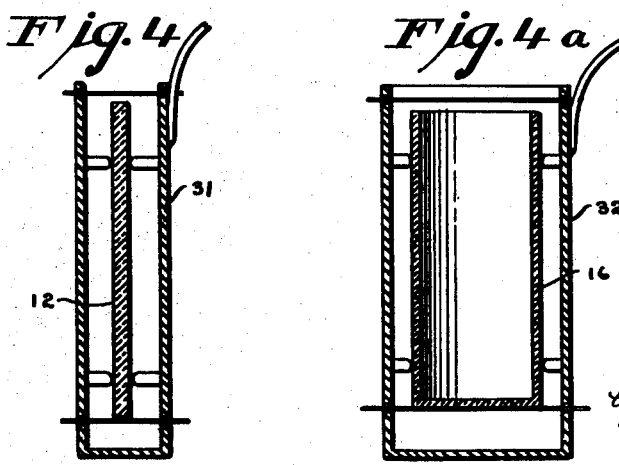

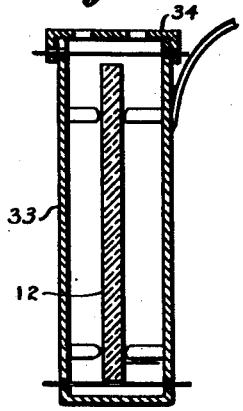
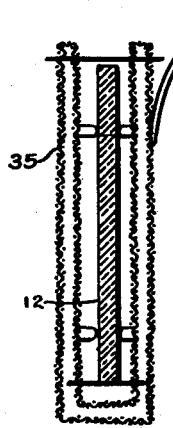
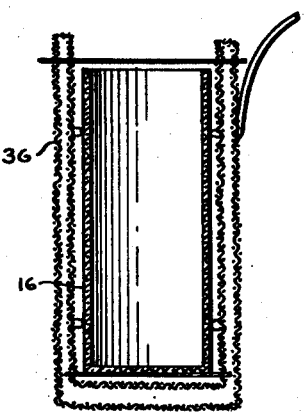
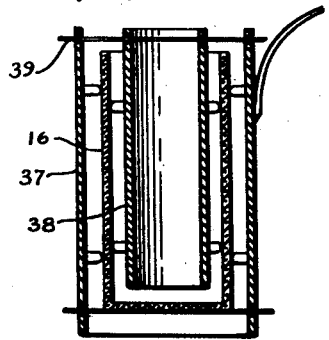
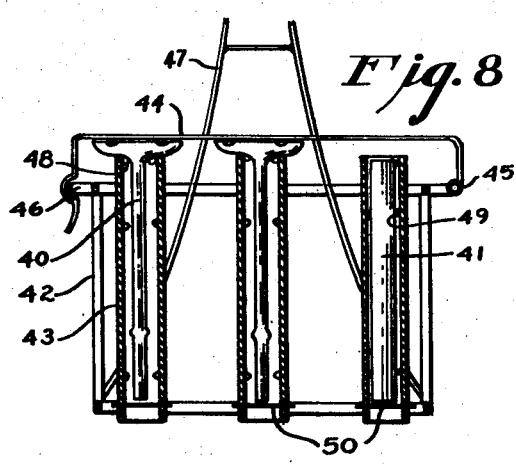
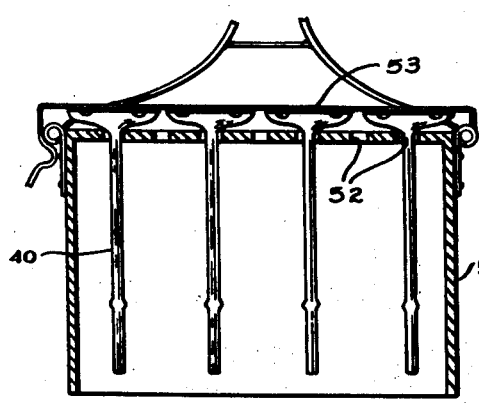

2,359,222

UNITED STATES PATENT OFFICE 2,359,222

MEANS FOR TEMPERING GLASS ARTICLES

Harry R. Kiehl and William W. Shaver, Corning, N. Y., assignors to Corning Glass Works, Corning, N. Y., a corporation of New York Original application August 3, 1940, Serial No. 350,744. Divided and this application March 1, 1941, Serial No. 381,344

4 Claims. (Cl. 49—45)

This application constitutes a division of our co-pending application Serial Number 350,744, filed August 3, 1940, which is directed to Methods of tempering glass articles.

This invention relates to the tempering of glass articles by heating them and thereafter suddenly cooling them to a substantially lower temperature whereby compressional stress is produced in the surface of the glass. The usual practice is to heat the article in air within a furnace or by means of a molten salt bath heated to the desired temperature and then to transfer the article to a fluid cooling or chilling medium which may be gaseous, as ordinary air, or liquid, as a molten salt bath heated to a temperature substantially lower than that of the furnace or bath first mentioned. Such methods are illustrated and described in detail in the British Patent No. 477,585 accepted December 30, 1937.

During the time of transfer of the article from the heating medium to the cooling medium the article loses heat by radiation and convection to its surroundings in sufficient quantities to materially reduce the amount of stress to be obtained and hence to fall short of the desired mechanical strength of the article or to cause such nonuniformity in the stress that the article is weak and liable to break spontaneously. Such reduction of mechanical strength is encountered in the case of sheet glass thus tempered and is particularly evident in the case of hollow articles, especially those having thin walls; such as tubes, percolator bowls, percolator pumps, etc., or those in which the bottom and side walls are substantially different in thickness and the diameter to height ratio small; such as tumblers, milk bottles, and the like. In the tempering of glass articles by the prior method the heat radiation and convection losses during the transfer of the article from the heating medium to the cooling medium permits the surface to cool more rapidly than the interior in the case of sheets and in the hollow article permits the exterior surface to cool more rapidly than the interior surface thereby establishing substantial temperature gradients between exterior and interior and also between the thinner and thicker portions of the article. When a glass sheet in this condition is suddenly subjected to the influence of the cooling medium the exterior, particularly in the case of thin sheets, does not undergo the temperature drop intended and does not acquire the desired degree of compressional stress. In the case of hollow articles not only is there is a failure to attain the desired degree of compressional stress in the exterior surface, but the compressional stress developed in the interior surface is still lower and may actually become a tensional stress due to delayed cooling. A further difficulty encountered in the tempering of glass articles by the prior method is the inability of articles of high expansion glass such as ordinary soda lime glass to withstand the thermal shock of sudden large decreases in temperature without the development of surface checks.

The primary object of this invention is means to temper glass articles with a predetermined high degree of compressional stresses in the surfaces thereof.

Another object is means to prevent substantial heat losses from the exposed surface of an article during its transfer from the heating medium to the cooling medium.

A further object is means to control the cooling rates of various surfaces of the article while it is being subjected to the action of a cooling medium.

Still another object is means to temper a hollow article so that its interior surface will have substantially the same compressional stress as, or, if preferred, a predetermined stress different from that of its exterior surface.

A further object is means to subject articles of high expansion glass to a chilling medium in such a manner that a greater decrease in temperature is brought about than was heretofore possible without the production of checks in the surfaces thereof.

The above and other objects may be accomplished by practicing our invention which, among its features, comprises directing heat upon the exterior of the article during its transfer from the heating medium to the cooling medium and controlling the cooling rate of the article after the transfer.

Another feature of the invention comprises enclosing at least the vertically disposed sides of the article in a temperature controlling screen or shield, and hereinafter referred to generally as a shield, having a substantial heat capacity, heating the article and the shield to a selected temperature and transferring them to a fluid cooling medium.

A further feature of the invention comprises placing the article in a shield adapted to contain liquid, submerging the article and shield in a liquid heating bath and transferring the article and the fluid filled shield to a liquid cooling bath.

The invention also includes the apparatus comprising a shield for containing a glass article while the same is being heated and suddently cooled and adapted to reflect and radiate heat upon the surface of the article after it has been removed from the heating fluid.

In order that the invention may be clearly understood and readily carried into effect reference is had to the accompanying drawings in which:

Figs. 1, 1a, 1b, and 1c are sectional elevations illustrating similar forms of apparatus embodying the invention which are suitable for use in the treatment of solid and hollow glass articles held therein;

Figs. 2 and 2a are views illustrating apparatus similar to those of Figs. 1–1c, but with modified forms of enclosing structure embodying the invention and suitable for use in the tempering of glass articles;

Fig. 3 is a sectional view of another modified form of structure which has an increased heat capacity and which is suitable for practicing the invention;

Figs. 4 and 4a are sectional views of structures in the form of closed bottom shields adapted for tempering solid and hollow articles, respectively, in accordance with the invention;

Fig. 5 is a sectional view of a structure similar to that shown in Fig. 4, but provided with a cover in accordance with the invention;

Figs. 6 and 6a are sectional views of structures similar to those shown in Figs. 4 and 4a, respectively, but composed of metal screen or similiar material;

Fig. 7 is a sectional view of another structure which is adapted for tempering hollow glass articles in accordance with the invention;

Fig. 8 is a sectional view of a structure adapted for simultaneously tempering a plurality of glass articles of a general tubular shape, in accordance with the invention; and Fig. 9 is a sectional view of a modified form of the structure shown in Fig. 8.

In practicing the invention, it is to be understood that the general method of tempering a glass article by heating it and suddenly cooling it as described and illustrated in the above-mentioned British patent is applicable to the purpose of the present invention. The apparatus herein illustrated in its simplest form and hereinafter to be more fully described may be adapted to be added to and incorporated with the prior apparatus.

In Fig. 1 is shown a shield 11 the walls of which conform to the general shape of a flat glass article 12 contained therein to be tempered. The article 12, supported on cross wires 13, is held in suitable spaced relation with respect to the surrounding sidewalls of the conduit by low thermal capacity fins 14 preferably welded to the sidewalls of conduit.

By means of a suitable handle 10 attached to the shield the same with the article 12 held therein is first introduced into a suitable heating fluid and held therein until the article and the shield attain a temperature substantially above the strain temperature of the glass after which they are transferred to a suitable chilling fluid heated to a substantially lower temperature and held therein in a substantially upright position. During the period of transfer the heat radiated by the shield tends to maintain the temperature of the surfaces of the glass, and the shield also functions to radiate back into the article heat radiated from the surfaces thereof and at the same time protects the article from direct contact with the surrounding atmosphere. The net result is little or no heat loss during a reasonable time period of transfer from the heating to the chilling fluid. Furthermore, owing to the heat capacity of the shield, which may be varied to meet any desired requirements by the proper selection of metal and/or its thickness, the temperature of the chilling fluid first contacting the article may be raised sufficiently to prevent too great a heat shock which might cause the formation of surface checks. A further function of the shield is to promote convection currents in the chilling fluid adjacent the glass article and to control and guide their flow near the surfaces thereof.

In Fig. 1a the shield structure 15 is similar to that of shield 11, but is shaped to accommodate a tumbler 16 or any article of similar shape, such as a piece of tubing. The method of treating a piece of tubing is identical with that of the treatment of the flat glass article 12. In the treatment of the tumbler 16 the method is modified to the extent that the shield is introduced into the heating fluid in a manner to dip or scoop the tumbler full of the heating fluid. On withdrawal from the fluid, it is tilted so as to empty it. The same steps are carried out with regard to introduction and withdrawal of the tumbler from the chilling fluid except that while in the chilling fluid it is held inclined or upright. It therefore becomes necessary to provide a tumbler hold-down device to prevent displacement of the tumbler with respect to the shield. This device in its simplest form may comprise a wire 17 passed through perforations in the shield walls. The resultant advantageous effect of the shield on the outer wall surfaces of a hollow glass article is similar to that obtained on the surfaces of a solid glass article. An additional outstanding advantage of this method of tempering a hollow glass article is the retardation of the cooling rate of the outer surfaces while in the cooling fluid to such an extent as to suitably control the rate of cooling of the interior surface of the article with respect to that of its outer surface. The rate of cooling of the outer surface may also be further controlled by variation of the spacing between the shield and the surface of the article so as to vary the volume of fluid passing therebetween during the chilling treatment.

In Fig. 1b the conduit 18 is similar to the shield 15 in Fig. 1a except that a bottom 19 is provided for effecting heat transfer to the bottom of the tumbler as well as to the exterior sidewalls thereof. Apertures 20 in the bottom 19 are of sufficient size and number to offer substantially no resistance to the free flow of chilling fluid in the space between the tumbler and shield sidewalls. The steps in the treatment of a tumbler by means of the apparatus of Fig. 1b are identical to those heretofore described.

In Fig. 1c the structure 21 differs from that of Fig. 1b only to the extent that the apertures in the shield bottom are reduced in size to reduce the volume of chilling fluid permitted to flow thereby further reducing the cooling rate of the exterior surface of the article.

In Fig. 2 the shield 22 with an open bottom similar to that of Fig. 1 is provided with a top 23 having a series of slots 24 which are of such size as to suitably control the rate of flow of chilling fluid. The manner of using this shield is the same as that described above for the structure of Fig. 1.

In Fig. 2a the shield 26 which is adapted for the tempering of a tumbler contained therein is provided with a top plate 28 having the center cut out to expose the top of the tumbler and leave a limited space around it for the flow of chilling fluid out of the shield under the influence of convection currents. The procedure for tempering is the same as that previously described for tumblers and the like.

In Fig. 3 the shield 29 has a lower section 30 of large heat capacity with a small fluid flow space 27 extending therethrough. This form of structure is used in the same manner as those previously described for use with solid glass articles and is especially adapted for the tempering of glass by a chilling fluid of much lower temperatures than the glass would ordinarily withstand without checking, as the heat stored in the sections 30 will modify the temperature of the fluid which first encounters the article surfaces thereby preventing too great an initial thermal shock.

In Figs. 4 and 4a the shields take the form of closed bottom enclosures 31 and 32. In the treatment of either a solid glass article or a hollow one the method of procedure is substantially the same. After filling a shield and heating it to the desired temperature in a liquid heating bath, the shield and all its contents of liquid are transferred to the chilling bath and held in an upright position therein. The heating liquid carried over retards the effect of the chilling liquid on the article until the heating liquid within the shield has been displaced by chilling liquid through convection. When such a method is employed extremely low temperature chilling fluids can be successfully used. It will be apparent that in using this method the liquids employed for heating and chilling must be of the same composition or must be inert and non-reactive with respect to each other.

In Fig. 5 a shield 33 is illustrated which is similar to the shield 31 of Fig. 4, but is provided with a slotted cover 34 which retards the exchange of fluid between the interior and exterior of the shield. The method of use is the same as that followed when using the structure of Fig. 4.

In Figs. 6 and 6a the glass articles are held within shield structures 35 and 36 which are of the forms of those of Figs. 4 and 4a, but are composed of two or more layers of fine mesh screen material. These structures are used in the same manner as are the structures of Figs. 1 and 1a. The screen material, while affording protection to the glass during transfer from a heating to a chilling fluid, allows substantially free flow of the chilling fluid into contact with the adjacent surfaces of an article contained therein as the structure is lowered into such fluid. The heat absorbed by the chilling fluid from the screen material as it passes therethrough, however, modifies the temperature of the fluid first to contact the glass surface adjacent the screen material.

The structure of Fig. 7 comprises a shield 37 similar to shield 15 of Fig. 1a and a shield 38 held within the tumbler by a hold-down wire 39. The manner of using this structure is the same as the manner of using the structure of Fig. 1a. With the structure of Fig. 7, however, the shield 38 functions while in the chilling fluid to give a chimney effect to fluid circulating through the interior of the tumbler. By modifying the diameter of the shield 38 this effect can be modified to produce various desired results.

In Fig. 8 there is shown a structure designed primarily for the treatment of coffee percolator pumps 40, lengths of tubing 41, or similar articles. The structure comprises a framework 42 containing a number of shields 43 with a hold-down strip 44 hinged at 45 and at its other end latched over a projection 46 of the framework 42, and with a handle 47 for lowering and raising the structure into and out of the heating and chilling fluids. As is clearly illustrated, a coffee percolator pump to be treated has its stem projected down into the bore of a shield and is supported on the top edge thereof by the pump flange. To prevent such flange from interfering with the free flow of chilling fluid through the shield, the upper end of the latter is provided with fluid channels 48.

To adapt the structure for use in the treatment of straight or unflanged pieces of tubing such, for example, as the piece of tubing 41 illustrated, the shields are provided with conventional forms of spacing elements 49 and supporting wires 50 similar to those provided in the preceding structures.

In Fig. 9 is shown a modified shield structure also suitable for use in the treatment of percolator pumps or similarly shaped articles having flanges or flares by means of which they can be supported. This structure is simply in the form of a bottomless box 51 having perforations 52 in the top for the receipt of stems of glass articles and for permitting the free passage of air out of the box when the same is lowered into the heating or chilling fluid, and for subsequent control of the liquid flow. A hinged hold-down device 53 similar to that shown in Fig. 8 is also provided.

The manner of use of the structures of Figs. 8 and 9 is substantially the same as is set forth in the discussion concerning Fig. 1.

If desired, the various individual shield structures shown in the drawings for containing glass articles while they are being heated and chilled may be provided with a plurality of walls spaced apart from one another. The use of a plurality of walls permits a reduction in the weight of the apparatus because it has been found that two walls of thin material are fully as effective as a single wall having a thickness greater than that of the two walls combined and hence having also greater weight.

The use of the glass containing shields illustrated results in the maintenance of essentially constant compression values for transfer time as high as 5 to 7 seconds and for longer transfer times the decrease in compression values is less than that obtained by the prior method without the use of such shields. For example, a series of plates of borosilicate glass one-eighth inch thick were tempered according to the prior method by heating them to a temperature of about 700° C. in a molten bath comprising a mixture of sodium and potassium nitrates and were thereafter quenched in a similar bath heated at about 250° C. Transfer times ranging from 2 to 20 seconds were used with the samples held about 6 inches above the chilling bath (air temperature about 65° C.) until the required time had elapsed. A similar series of like plates enclosed in shields composed of 20 gauge sheet iron in accordance with the invention were also tempered in the same manner. Stress measurements provided the following data:

TABLE I
*Average maximum compression*

| Transfer time, seconds | Plate enclosed | Plate not enclosed | Difference | Percent difference |
|---|---|---|---|---|
| | $Kg./mm.^2$ | $Kg./mm.^2$ | $Kg./mm.^2$ | |
| 2 | 3.93 | 3.48 | 0.45 | 11.5 |
| 3 | 3.63 | 2.90 | 0.73 | 20.1 |
| 4 | 3.51 | 2.69 | 0.82 | 23.4 |
| 5 | 3.67 | 2.47 | 1.20 | 32.7 |
| 6 | 3.90 | 2.62 | 1.28 | 32.8 |
| 7 | 3.55 | 2.31 | 1.24 | 36.0 |
| 8 | 3.41 | 1.82 | 1.59 | 46.6 |
| 9 | 3.47 | 2.15 | 1.32 | 38.0 |
| 10 | 3.30 | 1.59 | 1.71 | 51.8 |
| 12 | 3.20 | 1.24 | 1.96 | 61.2 |
| 14 | 2.99 | 1.17 | 1.82 | 60.8 |
| 16 | 2.78 | 0.83 | 1.95 | 70.1 |
| 18 | 2.66 | 0.92 | 1.74 | 65.4 |
| 20 | 2.44 | 0.65 | 1.79 | 73.3 |

The effect of enclosing the article during tempering, as above illustrated, varies with the thickness of the glass and for thinner articles the effect is still greater.

In the case of hollow articles tempered in accordance with the invention, the compressional stress values of the interior and exterior surfaces remain substantially equal for transfer times up to 10 seconds while the corresponding values for hollow articles tempered according to the prior method are substantially different. For example, a series of glass tubes having a length of 2 inches and a wall thickness of one-eighth inch and composed of borosilicate glass were tempered according to the prior method. A similar series of glass tubes were enclosed in sheet iron shields and likewise tempered in accordance with the invention. Compressional stress measurements of the interior and exterior surfaces gave the following results:

TABLE II

| Transfer time | Enclosed | | |
|---|---|---|---|
| | Inside compressional stress | Outside compressional stress | Difference |
| | $Kg./mm.^2$ | $Kg./mm.^2$ | |
| 2 | 3.22 | 3.22 | |
| 4 | 3.34 | 3.34 | |
| 6 | 3.64 | 3.64 | |
| 8 | 3.20 | 3.31 | .11 |
| 10 | 3.02 | 3.02 | |
| 12 | 3.03 | 3.03 | |
| 14 | 2.81 | 2.49 | −.32 |
| 16 | 2.93 | 2.66 | −.27 |
| 18 | 2.74 | 2.73 | −.01 |
| 20 | 2.54 | 2.38 | −.16 |

| Transfer time | Not enclosed | | |
|---|---|---|---|
| | Inside compressional stress | Outside compressional stress | Difference |
| | $Kg./mm.^2$ | $Kg./mm.^2$ | |
| 2 | 3.12 | 3.61 | .49 |
| 4 | 1.88 | 3.00 | 1.12 |
| 6 | 2.30 | 3.00 | .70 |
| 8 | 1.83 | 2.47 | .64 |
| 10 | 1.34 | 1.99 | .65 |
| 12 | 0.96 | 1.77 | .81 |
| 14 | 0.64 | 1.40 | .76 |
| 16 | 0.75 | 1.40 | .65 |
| 18 | 0.48 | 1.07 | .59 |
| 20 | 0.64 | 1.40 | .76 |

The following will illustrate the advantageous effect of the invention in preventing the checking of high expansion glass articles when subjected to a sudden cooling from a highly heated state. A series of plates composed of soda lime glass were tempered by the prior method by heating them to about 700° C. in a $NaNO_3$—$KNO_3$ molten bath and thereafter chilling them in baths of like composition heated at temperatures ranging from 250° to 460° C. using an average transfer time of 2 seconds. A similar series of like plates enclosed in shields of sheet iron in accordance with the invention were also tempered in the same manner. The plates treated by the prior method were checked when the chilling bath temperature was 370° C. or lower. The plates tempered in accordance with the invention were substantially free from checks at chilling bath temperatures as low as 275° C.

While in the foregoing specification the invention has been described and illustrated in its simplest embodiments as applied to the tempering of sheets, tumblers, and tubes of glass, it will be apparent that the invention may be applied to the tempering of other glass articles and that minor changes in the form, shape, and arrangement of the various parts of the apparatus to adapt it to such other articles may be made without departing from the spirit and scope of the invention as claimed.

We claim:

1. A shield for a glass article to be tempered comprising two integral sections of material one of which is of great mass compared to the other, said sections having a common passageway therethrough opening to atmosphere at the opposite ends thereof, and means for holding an article within the confines of one of said sections.

3. A shield for a glass article to be tempered comprising a sidewall for surrounding the article having an endwall of great mass compared to that of the sidewall, said endwall having a passageway therethrough opening to atmosphere and to the interior of the sidewall, and means for holding an article within the confines of the sidewall.

3. A shield for a glass article to be tempered comprising a sidewall for surrounding the article and having an endwall of great mass compared to that of the sidewall, and having a passageway therethrough opening to atmosphere and into the interior of the sidewall, the size of said passageway being small compared to the cross sectional area of the interior of the sidewall and means for holding an article within the sidewall.

4. A shield for a glass article to be tempered comprising a sidewall for surrounding an article and an endwall, one of said walls having great mass compared to the other and means for holding an article within the confines of the sidewall.

HARRY R. KIEHL.
WILLIAM W. SHAVER.